United States Patent
Pontis et al.

(10) Patent No.: US 6,829,268 B2
(45) Date of Patent: Dec. 7, 2004

(54) SYNCHRONOUS SERVO CONTROL FOR A TUNABLE LASER

(75) Inventors: George D. Pontis, Redwood City, CA (US); Douglas A. Sprock, San Jose, CA (US); Robert A. Carney, Belmont, CA (US); Ken P. Koller, Half Moon Bay, CA (US); Rajesh K. Batra, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/329,104

(22) Filed: Dec. 23, 2002

(65) Prior Publication Data

US 2004/0120365 A1 Jun. 24, 2004

(51) Int. Cl.[7] .............................. H01S 3/13; H01S 3/00
(52) U.S. Cl. .................. 372/38.08; 372/29.01; 372/29.011; 372/29.02; 372/38.01; 372/38.02; 372/38.07; 372/29.015
(58) Field of Search ............................ 372/38.01, 38.02, 372/38.07, 38.08, 29.01, 29.011, 29.015, 29.02, 20, 26, 23

(56) References Cited

U.S. PATENT DOCUMENTS 6,353,623 B1 * 3/2002 Munks et al. .................. 372/20
6,400,737 B1 * 6/2002 Broutin et al. ................. 372/20

* cited by examiner

*Primary Examiner*—Don Wong
*Assistant Examiner*—Armando Rodriguez
(74) *Attorney, Agent, or Firm*—Blakely, Sokoloff, Taylor & Zafman LLP

(57) ABSTRACT

Tunable laser systems use servo control loops to control and monitor laser parameters such as channel, temperature, and power. The many control loops operate asynchronously, which means that noise generated by input sampling and/or output updating from one or more loops could interfere with the sampled inputs of one or more of the other loops. Embodiments of the present invention synchronize setting and sampling of tunable laser parameters to reduce noise. Noise that is related to synchronized setting and sampling of tunable laser parameters allows the noise to be reduced to constant offsets to be compensated for in the laser parameters of interest.

22 Claims, 5 Drawing Sheets

SYNCHRONOUS SERVO CONTROL FOR A TUNABLE LASER

BACKGROUND

1. Field

Embodiments of the present invention relate to laser systems and, in particular, to tunable external cavity diode lasers systems.

2. Discussion of Related Art

Tunable lasers are deployed in such applications as telecommunication network test systems, spectroscopy research, and sensing for process control. They are also becoming recognized as essential components in the rapidly growing field of wavelength division multiplexing ("WDM") for optical communication systems. There are various well-known or proprietary designs for tunable lasers and each is usually tailored for a particular use. The specific design depends on many factors, including the light beam (e.g., power, wavelength, tunability), operating environment (e.g., temperature), and practical considerations (e.g., size, cost).

FIG. 1 shows a typical tunable external cavity laser 100. The laser 100 includes a gain medium 102, which has one facet 104 anti-reflective (AR) coated and another facet 106 coated with a highly reflective material. The gain medium 102 is typically a diode laser. The light output from the facet 104 is collimated by a lens 108 onto a diffraction grating 110, which diffracts the light towards a mirror 112. The mirror 112 reflects a particular wavelength back to the grating 110 and the gain medium 102. The facet 106 and the grating 110 form a cavity. The output of the laser 100 is the light beam 114. To tune the laser to another wavelength, the mirror 112 is adjusted accordingly. There are other well-known tunable external cavity laser designs, such as a well-known Littrow external cavity laser, which has one or more frequency-selective components positioned in the cavity for tuning.

To ensure proper operation of any tunable laser including the tunable laser 100, many of the parameters (e.g., power, wavelength, temperature) are controlled and monitored by servo control loops. It is common for each parameter to have its own separate control loop for setting, updating, and sampling laser parameters such as power, channel, and temperature. Separate loops can be problematic because each control loop operates asynchronously and the noise generated by sampling and/or updating from each loop could interfere with sampling of one or more of the other loops (cross talk). The noise may present itself as intermittent noise sources, which adds to the overall system noise and potentially degrades system performance. Typically, there are many control loops in a tunable laser system, thus many potential opportunities for cross talk. Noise also can come from a non-ideal ground plane, a power supply load change, unwanted coupling from digital I/O lines, or other sources.

Noise is commonly minimized by a combination of amplifying the signal of interest and filtering out the noise. However, as tunable lasers are moving towards smaller form factors noise compensation using amplifier circuits, filtering circuits, and other signal-to-noise ratio (SNR) increasing circuitry may not be appropriate.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 2:
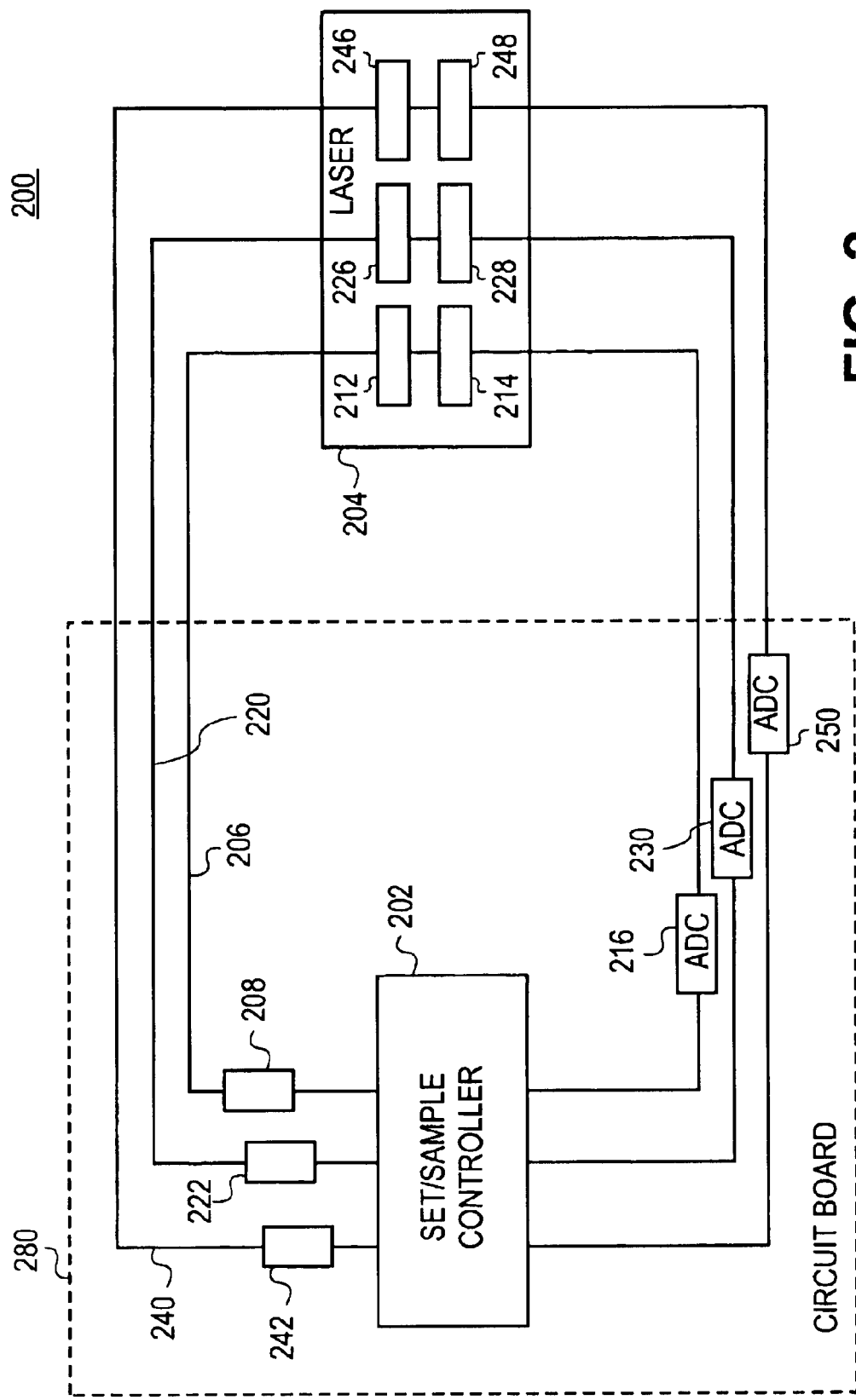
FIG. 2 is a schematic diagram of a tunable laser synchronous servo control system according to an embodiment of the present invention.

FIG. 2 is a schematic diagram of a tunable laser synchronous servo control system (laser system) 200 according to an embodiment of the present invention. The laser system 200 includes a digital set/sample controller 202 on a circuit board 280 and coupled to a tunable external cavity diode laser 204 via analog/digital interfaces on several servo control loops. The set/sample controller 202 may be used to control and monitor parameters of the tunable external cavity diode laser 204.

In the embodiment shown, one servo control loop is a temperature control loop 206. The example temperature servo control loop 206 includes a temperature element driver 208, which is coupled between the set/sample controller 202 and a temperature element 212. The temperature element 212 is coupled to a temperature sensor 214. The temperature sensor 214 is coupled to an analog-to-digital converter (ADC) 216, which is coupled to the set/sample controller 202.

Figure 1:
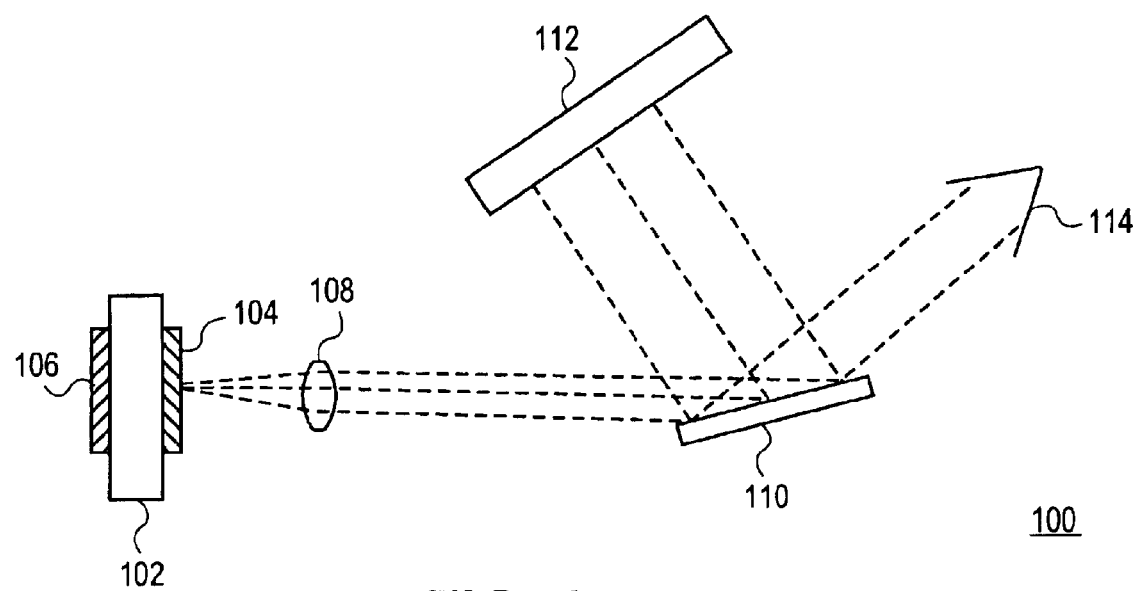
FIG. 1 is a schematic diagram of a tunable external cavity laser (ECL)

The tunable external cavity diode laser 204 can be any suitable well-known or proprietary tunable external cavity diode laser such as the tunable external cavity diode laser illustrated in FIG. 1. The temperature element driver 208 can be any suitable well-known or proprietary temperature element driver. The temperature element 212 can be any suitable well-known or proprietary temperature element, such as any well-known thermal electric cooler (TEC) or Peltier cooler. The temperature sensor 214 can be any suitable well-known or proprietary temperature sensor, such as a thermistor. The ADC 216 can be any suitable well-known or proprietary analog-to-digital converter.

Another example servo control loop is a laser channel selector loop 220. The laser channel selector loop 220 includes a laser channel selector driver 222, which is coupled between the set/sample controller 202 and a laser channel selector 226. The laser channel selector 226 is coupled to a laser channel sensor 228. The laser channel sensor 228 is coupled to an ADC 230, which is coupled to the set/sample controller 202.

The laser channel selector driver 222 may be any suitable well-known or proprietary laser channel selector driver and the ADC 216 may be any suitable well-known or proprietary analog-to-digital converter. The laser channel selector 226 can be any suitable well-known or proprietary laser channel selector, such as a frequency-selective dispersive element (e.g., an etalon, prism, grating, birefringent filter, polarizing element). Alternatively, the laser channel selector 226 can be any suitable well-known or proprietary thermal tuner, stress tuner, electro-optic tuner, etc. The laser channel sensor 228 can be any suitable well-known or proprietary device(s) that detects the position of the frequency-selective dispersive element or senses the optical path length, l, of the tunable external cavity diode laser 204 (e.g., a position indicator, a linear encoder).

A third example servo control loop is a laser current control loop 240. The laser current control loop 240 includes a laser current driver 242, which is coupled between the set/sample controller 202 and a laser diode 246. The laser diode 246 is coupled to a laser current sensor 248, which is coupled to an ADC 250. The ADC 250 is coupled to the set/sample controller 202. Of course, embodiments of the present invention are not limited to the examples illustrated herein and persons of ordinary skill in the relevant art will be able to implement embodiments for various other laser parameters to be controlled and monitored.

The laser current driver 242 may be any suitable laser current driver. The ADC 250 may be similar to the ADC 230. The laser diode 246 can be any suitable well-known or proprietary device(s) that provides current for operation of the laser 204 such as laser diode or a gain medium current controller (i.e., to control the power delivered to the gain medium of the laser). The laser current sensor 248 can be any suitable well-known or proprietary device(s) that detects laser current (e.g., a resistor).

In one embodiment, the set/sample controller 202 synchronously sets one or more parameters of the laser 204, such as temperature, channel, and current. For purposes of illustration, suppose the set/sample controller 202 is to set and attempt to maintain the laser 204 temperature at thirty degrees Centigrade (C), to set and attempt to maintain the laser 204 operating on channel forty-four, and to set and attempt to maintain the laser 204 current at two hundred milliamps (mA). Suppose further that the set/sample controller 202 is to monitor and/or update the settings so that the laser 204 temperature, channel, and current are maintained accordingly.

Figure 3:
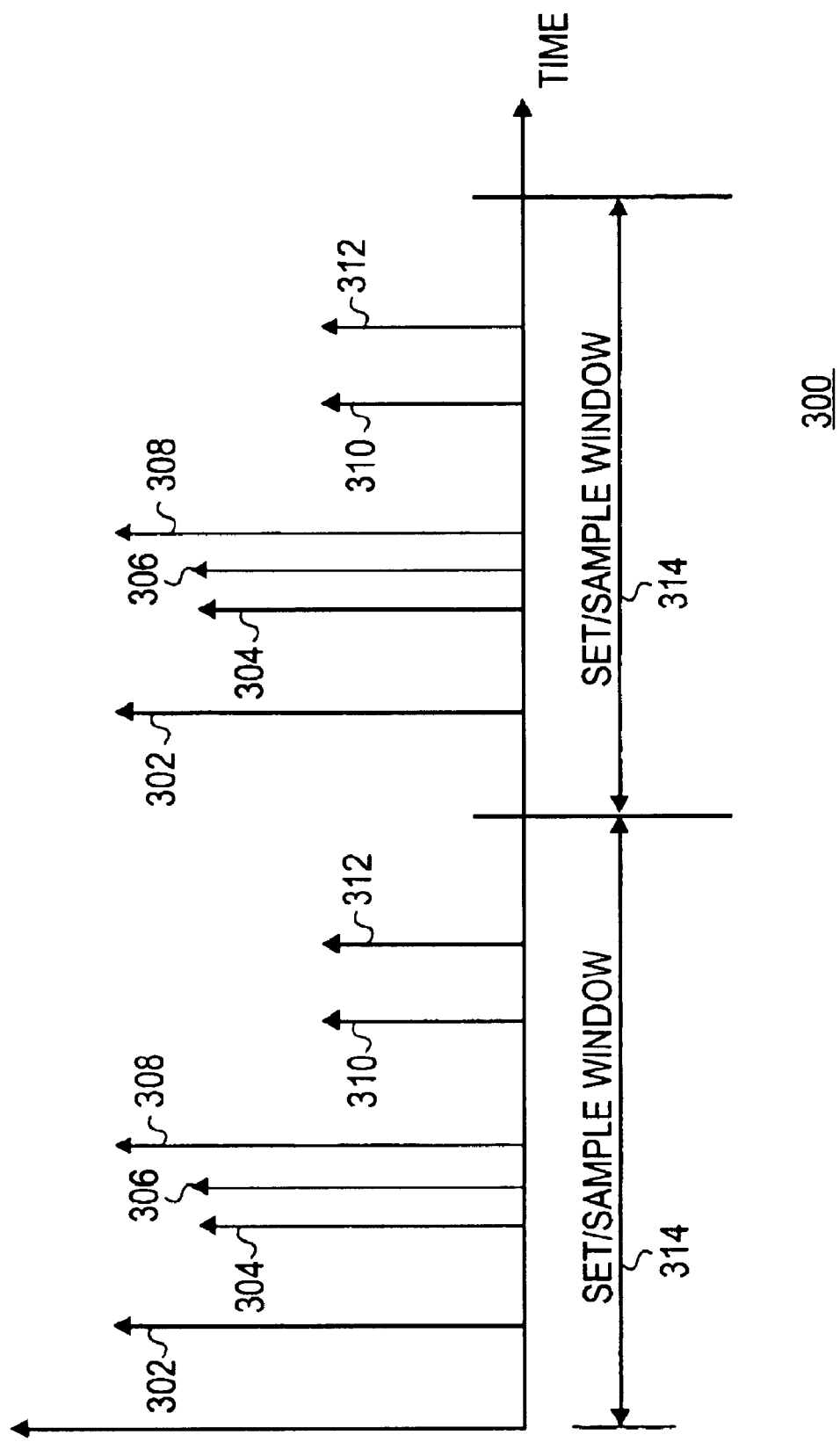
FIG. 3 is a graphical representation illustrating timing in the tunable laser synchronous servo control depicted in FIG. 2 according to an embodiment of the present invention.

FIG. 3 is a graphical representation showing timing of a method 300 for setting and sampling of temperature, channel and current of the laser 204 according to an embodiment of the present invention. In one embodiment, the set/sample controller 202 may perform the method 300. In an alternative embodiment, a machine-readable medium with machine-readable instructions thereon may be used to cause a processor to perform the process 300. Of course, the process 300 is only an example process and other processes may be used. The order in which they are described should not be construed to imply that these operations are necessarily order-dependent or that the operations be performed in the order in which the operations are presented.

The graphical representation shows times 302, 304, 306, 308, 310, and 312, and a series of set/sample windows 314 of time. At time 302, the temperature of the laser 202 is set. In one embodiment, the set/sample controller 202 sends a value representative of thirty degrees C to the temperature element driver 208, which drives the value to the temperature element 212. The temperature element 212 attempts to bring or maintain the laser 204 temperature at thirty degrees C.

At time 304, the channel of the laser 204 is set. In one embodiment, the set/sample controller 202 sends a value representative of channel forty-four to the laser channel selector driver 222, which drives the value to the laser channel selector 226. The laser channel selector 226 attempts to bring or maintain the channel of the laser 204 to channel forty-four.

At time 306, the channel of the laser 204 is sampled. In one embodiment, the laser channel sensor 228 provides an analog value representative of the laser 204 channel to the ADC 230, which converts the analog value to a digital value and drives the digital value to the set/sample controller 202. The set/sample controller 202 reads the digital value and determines whether the digital value is a value representative of the laser 204 operating on channel forty-four.

At time 308, the temperature of the laser 204 is sampled. In one embodiment, the temperature sensor 214 provides an analog value representative of the laser 204 temperature to the ADC 216, which converts the analog value to a digital value and drives the digital value to the set/sample controller 202. The set/sample controller 202 reads the digital value and determines whether the digital value is a value representative of a laser 204 temperature of thirty degrees C.

At time 310, the current of the laser 204 is set. For example, the set/sample controller 202 sends a value representative of two hundred mA to the laser current driver 242, which in one embodiment of the present invention drives the current to the laser diode 246. The set/sample controller 202 attempts to bring or maintain the current of the laser 204 at two hundred mA.

At time 312, the current of the laser 204 is sampled. In one embodiment, the current sensor 248 provides an analog value representative of the laser 204 current to the ADC 250, which converts the analog value to a digital value and drives the digital value to the set/sample controller 202. The set/sample controller 202 reads the digital value and determines whether the digital value is a value representative of a laser 204 current of two hundred mA.

Each set/sample window 314 has the same duration. In the example embodiment shown, for each set/sample window 314 times 302, 304, 306, 308, 310, and 312 form a pattern of setting, updating, and sampling of parameters that is repeated. For simplicity, only two set/sample windows 314 are shown. However, during operation, parameters for the laser 204 may be set, updated, and sampled continuously and thus many set/sample windows 314 are present.

Of course, the patterns may be different in different embodiments. For example, patterns may be chosen such that each parameter is sampled in a low noise environment (e.g., after other parameters have been set and settled before sampling occurs). For a particular implementation, however, the pattern repeats during each set/sample window or time period.

Figure 4:
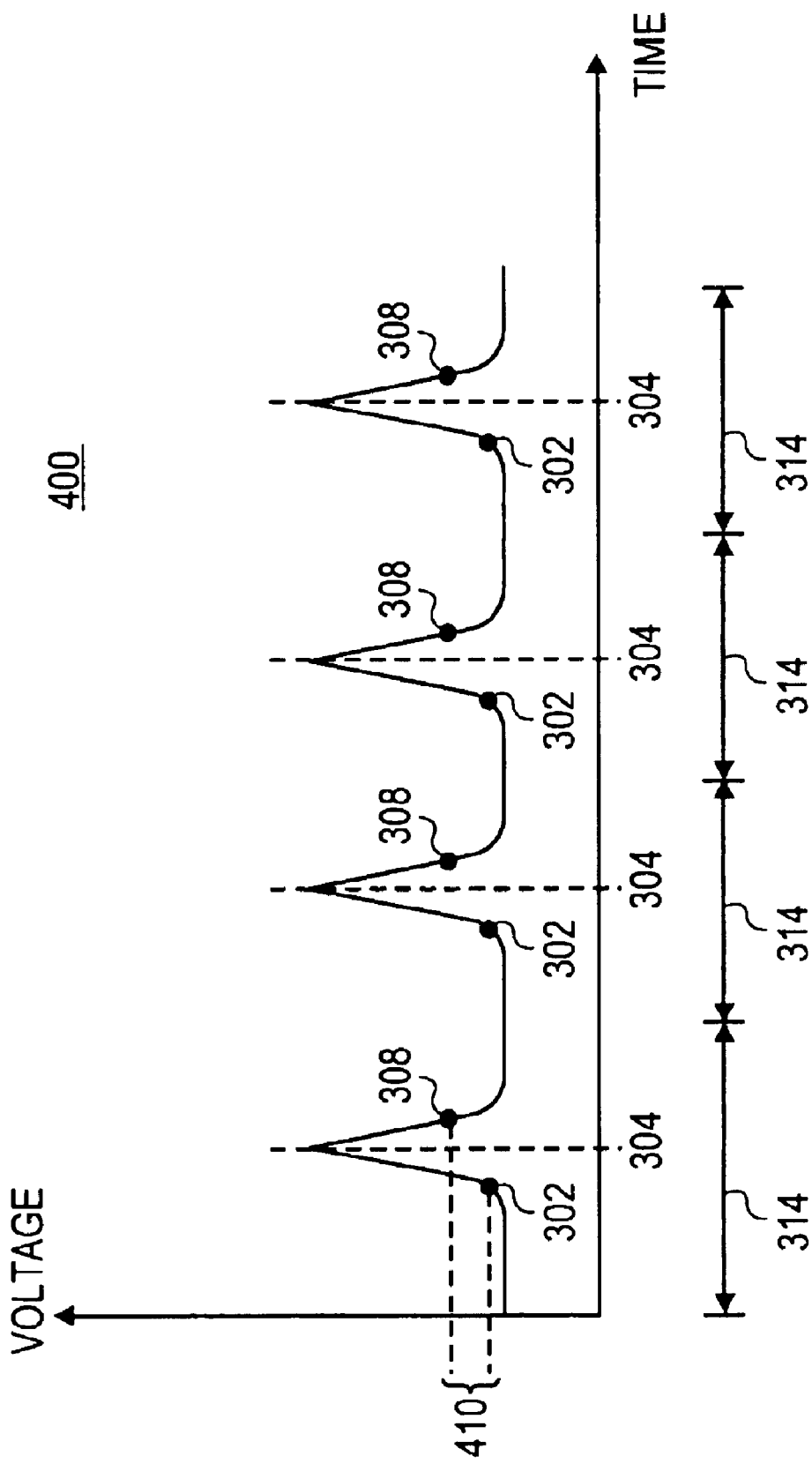
FIG. 4 is a graphical representation of an output of a laser temperature sensor according to an embodiment of the present invention.

Also, when the pattern is repeated during each set/sample window 314 the signal sampling point for a particular parameter is generally the same, in time. FIG. 4 is a graphical representation 400 of an output of the temperature sensor 214 according to an embodiment of the present invention showing the laser 204 temperature being set (updated) at time 302 and sampled at time 308 for each set/sample window 314. The graphical representation 400 also shows a spike at time 304 caused, for example, by setting the laser 204 at time 304, or from other cross talk by another synchronous servo loop. The graphical representation 400 illustrates that if the temperature is sampled each time at time 308, then sampling occurs at the same point in time in the set/sample window 314. When sampling occurs at the same point in time in the set/sample window 314, then if there is an offset caused by noise from another synchronous loop, for example, the offset will be constant because the noise from the other synchronous servo loops will likely have the same relationship in time to the signal being sampled.

In the embodiment shown, the constant offset is represented by offset 410, which can be compensated for during laser 204 calibration, for example, using well-known or proprietary offset compensation techniques. Of course, it is not necessary to know the value of the constant offset. As long as the offset is constant and not random or asynchronous, noise levels may be reduced.

Of course, the output of the current sensor 248, the output of the channel sensor 228, and other laser 204 parameter sensors also have constant offsets when set and sampled according to embodiments of the present invention. After reading the description herein, persons of ordinary skill in the relevant arts will readily recognize how to compensate for constant offsets for other laser 204 parameters.

The set/sample controller 202 can be implemented in a variety of ways. For example, in one embodiment, the set/sample controller 202 is implemented using a well-known or proprietary application specific integrated circuit (ASIC). Alternatively, the set/sample controller 202 may be implemented using well-known or proprietary field programmable gate array (FPGA). Alternatively still, the set/sample controller 202 may be implemented using a well-known or proprietary digital signal processor (DSP). After reading the description herein, a person of ordinary skill in the relevant art will readily recognize how to implement the set/sample controller 202 using these devices.

The set/sample controller 202 and the ADCs 216, 230, and 250 may by located on the circuit board 208 as a separate device. In this embodiment, the circuit board 208 connects to the laser 204.

Figure 5:
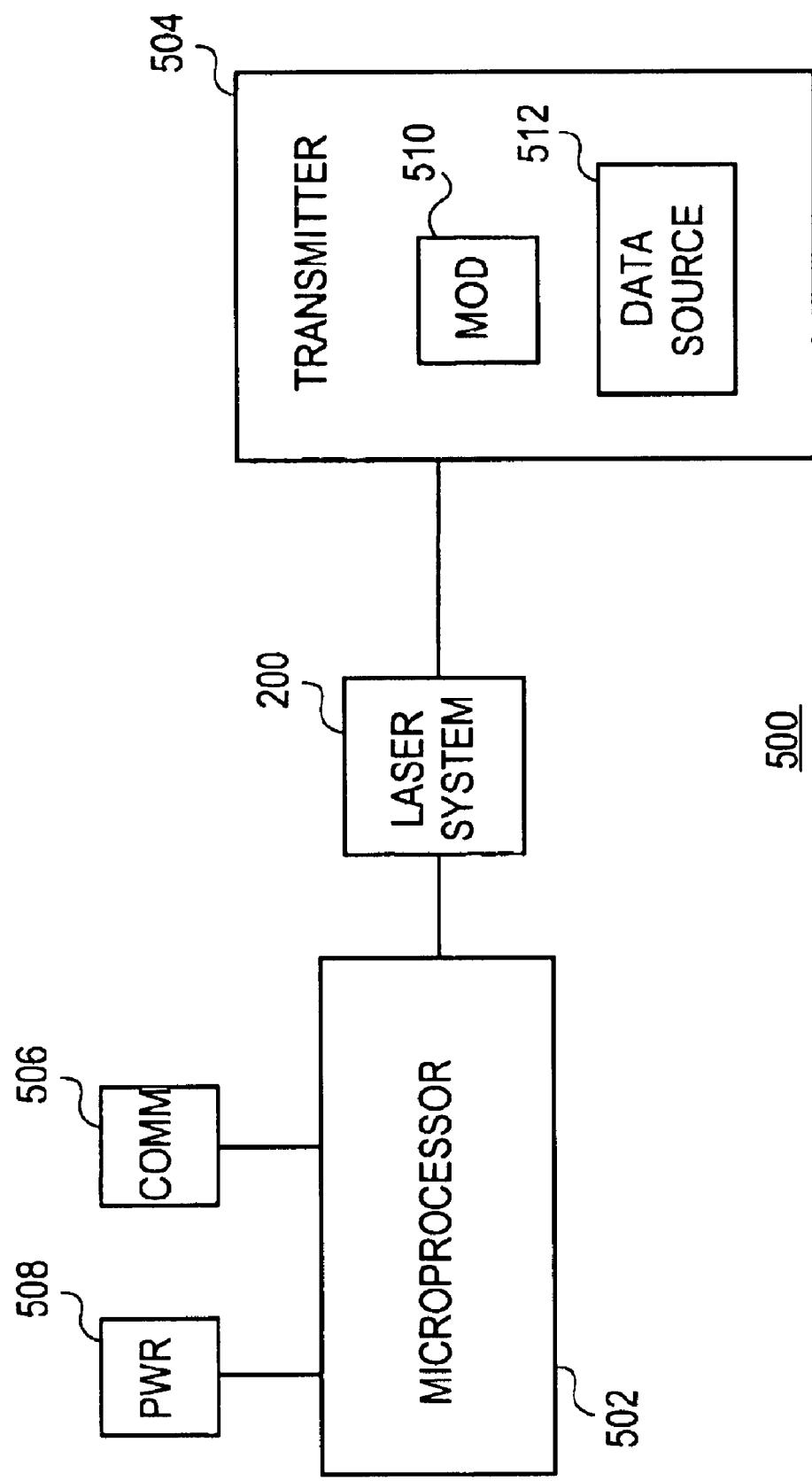
FIG. 5 is a high-level block diagram of an optical system according to an embodiment of the present invention.

FIG. 5 is a high-level block diagram of an optical system 500 according to an embodiment of the present invention. The example optical system 500 includes a microprocessor 502 coupled to the example tunable laser synchronous servo control system 200. The system optical 500 also includes a communication port 506 and a power source 508 coupled to the microprocessor 502 and the laser synchronous servo controller 200. The output of the tunable laser synchronous servo control system 200 is coupled to a transmitter 504.

The microprocessor 502 performs its conventional functions of executing programming instructions. The microprocessor 502 may implement embodiments of the present invention. For example, the microprocessor 502 may include internal logic that may be programmed to perform the set/sample synchronization process according to embodiments of the present invention. Alternatively, a machine-readable medium with machine-readable instructions thereon may be used to cause the microprocessor 502 to perform the set/sample synchronization process according to embodiments of the present invention. The microprocessor 502 can be a processor of the Pentium® family available from Intel Corporation of Santa Clara, Calif.

In embodiments of the present invention in which the set/sample controller 202 may be an FPGA, DSP, or ASIC, the set/sample controller 202 can be programmed to perform the set/sample synchronization independent of the microprocessor 502.

The transmitter 504 includes a modulator 510 and a data source 512. The data source 512 provides the data to be transmitted in the optical system 500. For example, the data source 512 may provide data, voice, graphics, video, etc. Data sources are well known. The modulator 510 modulates data from the data source 510 with the light beam from the laser 204. Modulators are well known.

The communication port 506 may be any suitable communication port, such as an RS-232 communication port. The power source 508 may be any suitable power source capable of supplying power to the microprocessor 502.

Of course, embodiments of the present invention are not limited to communication systems. For example, embodiments of the present invention may perform the set/sample synchronization process for well-known or proprietary spectroscopy systems, metrology systems, sensing systems, research and development systems, and/or testing systems.

While embodiments of the present invention have been described with respect to a tunable external cavity diode laser, embodiments of the present invention may include implementations using other photonic devices. After reading the description herein, persons of ordinary skill in the relevant art will readily recognize how to implement embodiments of the present invention for other photonic devices.

Embodiments of the invention can be implemented using hardware, software, firmware, or a combination of hardware and software. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Some parts of this description have been presented using terms such as, sample, update, monitor, window, and so forth These terms are commonly employed by those skilled in the art to convey the substance of their work to others skilled in the art.

Various operations have been described as multiple discrete operations performed in turn in a manner that is most helpful in understanding embodiments of the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    setting and sampling a first laser parameter using a first synchronous loop;
    setting and sampling a second laser parameter using a second synchronous loop, the setting and sampling of the first and the second laser parameters occurring in a predetermined window of time and in a predetermined timing pattern;
    repeating the setting and sampling of the first and the second laser parameters using the predetermined timing pattern for a subsequent predetermined window of time; and
    determining a constant offset between setting of the first laser parameter and sampling of the first laser parameter, the constant offset caused by noise from the second synchronous loop.

2. The method of claim 1, wherein setting and sampling the laser parameters comprises setting at least one of a laser temperature, a laser current, or a laser channel.

3. The method of claim 2, wherein sampling the laser parameters comprises reading a thermistor value.

4. The method of claim 2, wherein sampling the laser parameters comprises reading a resistor value.

5. The method of claim 2, wherein sampling the laser parameters comprises reading a frequency-selective element position indicator.

6. The method of claim 1, further comprising compensating for the constant offset during laser calibration.

7. An apparatus, comprising:
    set/sample controller to set and sample a first laser parameter using a first synchronous loop in a laser system, to set and sample a second laser parameter using a second synchronous loop in the laser system, to set and sample the first and the second laser parameters during a predetermined window of time, to set and sample the first and the second laser parameters in a predetermined timing pattern, to repeat the setting and sampling of the first and the second laser parameters using the predetermined timing pattern for a subsequent predetermined window of time, and to determine a constant offset between setting of the first laser parameter and sampling of the first laser parameter, the constant offset caused by noise from the second synchronous loop.

8. The apparatus of claim 7, wherein the first or the second laser parameter is temperature, current, or channel.

9. The apparatus of claim 8, wherein the set/sample controller is part of a field programmable gate array (FPGA).

10. The apparatus of claim 8, wherein the set/sample controller is part of an application specific integrated circuit (ASIC).

11. The apparatus of claim 7, wherein the set/sample controller is part of a microprocessor.

12. The apparatus of claim 8, wherein the set/sample controller is part of a digital signal processor (DSP).

13. A laser system, comprising:
    a tunable laser;
    a digital controller having circuitry to set and sample a first laser parameter using a first synchronous loop in the laser system, to set and sample a second laser parameter using a second synchronous loop in the laser system, to set and sample the first and the second laser parameters during a predetermined window of time, to set and sample the first and the second laser parameters in a predetermined timing pattern, to repeat the setting and sampling of the first and the second laser parameters using the predetermined timing pattern for a subsequent predetermined window of time, and to determine a constant offset between setting of the first laser parameter and sampling of the first laser parameter, the constant offset caused by noise from the second synchronous loop; and
    interface circuitry coupled between the tunable laser and the digital controller to interface signals between the tunable laser and the digital controller.

14. The system of claim 13, wherein the digital controller is at least one of a field programmable gate array (FPGA), an application specific integrated circuit (ASIC), or a digital signal processor (DSP).

15. The system of claim 13, further comprising a microprocessor.

16. The system of claim 15, wherein the digital controller is logic internal to the microprocessor.

17. The system of claim 13, wherein the interface circuitry includes at least one analog-to-digital converter.

18. The method of claim 1, further comprising allowing the first and the second laser parameters to settle between setting and sampling.

19. The method of claim 1, further comprising sampling the first and the second laser parameters at signal sampling points that are substantially the same for a particular laser parameter.

20. A laser system, comprising:
    a tunable laser;
    circuitry coupled to the tunable laser to set and sample a first laser parameter using a first synchronous loop in the laser system, to set and sample a second laser parameter using a second synchronous loop in the laser system, to set and sample the first and the second laser parameters during a predetermined window of time, to set and sample the first and the second laser parameters in a predetermined timing pattern, to repeat the setting and sampling of the first and the second laser parameters using the predetermined timing pattern for a subsequent predetermined window of time, and to determine a constant offset between setting of the first laser parameter and sampling of the first laser parameter, the constant offset caused by noise from the second synchronous loop; and
    a transmitter coupled to the tunable laser.

21. The laser system of claim 20, wherein the circuitry is further to sample the first and the second laser parameters at signal sampling points that are substantially the same for a particular first or second laser parameter.

22. The laser system of claim 20, wherein the transmitter comprises a modulator coupled to modulated data with a light beam from the tunable laser.

* * * * *